Aug. 20, 1940.   E. L. ERICKSON ET AL   2,212,095
FROST AND ICE REMOVER FOR WINDSHIELDS
Filed Aug. 26, 1938
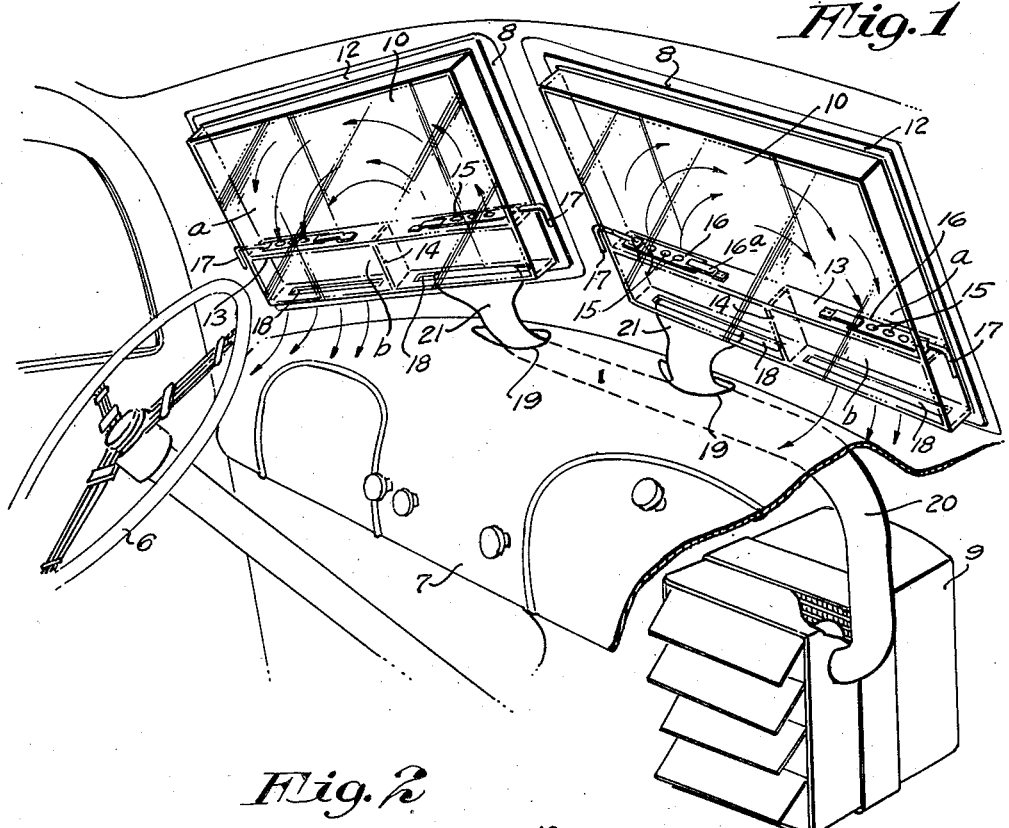
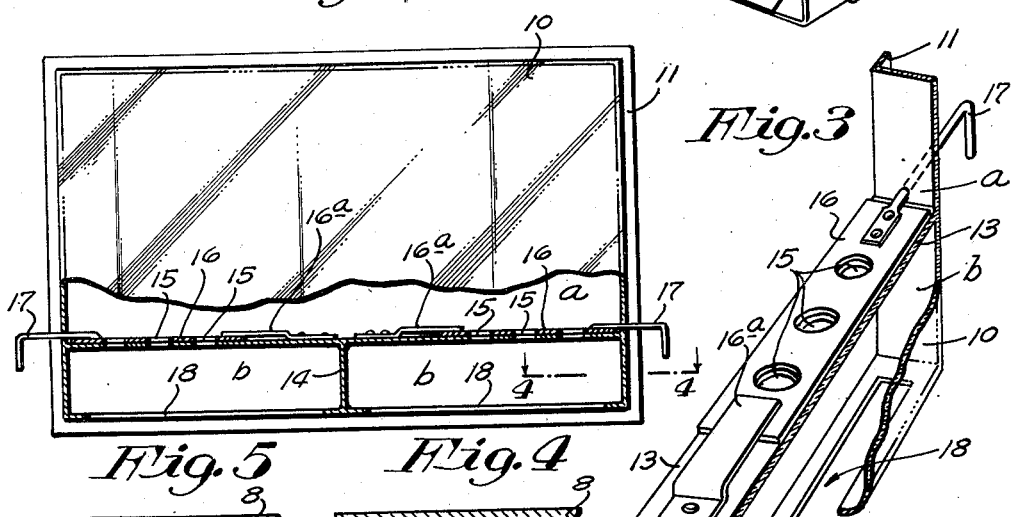
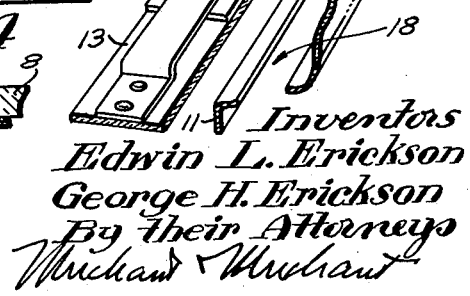
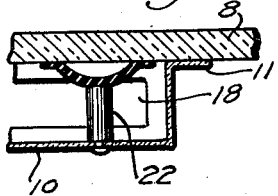
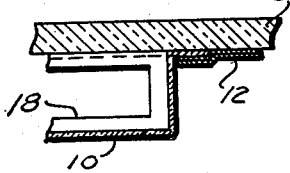
Inventors
Edwin L. Erickson
George H. Erickson
By their Attorneys Patented Aug. 20, 1940

2,212,095

UNITED STATES PATENT OFFICE 2,212,095

FROST AND ICE REMOVER FOR WINDSHIELDS

Edwin L. Erickson and George H. Erickson, Aitkin, Minn.

Application August 26, 1938, Serial No. 226,949

1 Claim. (Cl. 20—40.5)

Our invention provides an extremely simple and highly efficient frost and ice remover especially designed for windshields of all motor propelled vehicles of the automobile type, but adapted, nevertheless, for general application for windows where clear vision is required.

Generally stated the invention consists of novel devices, combination of devices and arrangement of parts hereinafter described and defined in the claim.

In the accompanying drawing which illustrates the invention we have shown two of the improved devices applied to the windshield of an automobile or like motor propelled vehicles. These devices, for brevity sometimes designated as frost removers, are arranged for the circulation of warm air over the inner surface of the windshield in such a way as to prevent the accumulation of frost or ice and/or permit the removal thereof from the windshield thereby maintaining clear vision even in very cold weather.

In the accompanying drawing like characters indicate like parts throughout the several views.

Referring to the drawing:

Fig. 1 is a perspective of parts broken away showing the cowl, windshield and associated parts of the automobile looking at the same from the rear of the windshield, and some parts being broken away;

Fig. 2 is a rear elevation of one of the devices, some parts being broken away and some parts being sectional;

Fig. 3 is a fragmentary perspective showing a portion of the lower part of one of the improved devices, and particularly illustrating a damper or gate for controlling circulation;

Fig. 4 is a fragmentary section taken on the line 4—4 of Fig. 2 and illustrating particularly one scheme for anchoring the devices to the windshield; and Fig. 5 is a view corresponding to Fig. 4 but illustrating a different way of anchoring the device to the windshield.

The parts of the automobile or motor propelled vehicle insofar as they have any bearing on the present invention, are the steering wheel indicated by numeral 6, the cowl indicated by numeral 7, the glass windshield indicated by numeral 8 and the heater indicated by numeral 9.

Each of the improved devices involves a partition frame and a transparent sheet or plate, which, by the frame, will be spaced from the windshield. The transparent pane 10 may be of various different transparent materials, but is preferably made of Celluloid, Bakelite or like transparent material. The marginal frame 11 may be of any suitable material, but as a feature of the present invention is made of transparent material such, for example, as that used for the sheet or plate 10. Said parts 10 and 11 may be integrally molded or separately formed and thereafter united.

To facilitate the anchoring of the frame to the windshield 8, it is flanged or made L-shaped in cross section, which adapts the frame to be detachably secured to the windshield by adhesive tape 12 or the like, which would be an operation easily performed and at the same time permit easy removal of the device when desired.

By a horizontal partition 13 the interior of the frame 11 is divided into an upper compartment $a$ and a lower compartment $b$. The lower compartment $b$ is subdivided into two compartments by a short vertical partition 14. Overlying the two subdivisions of the lower compartment $b$, partition 13 is formed with one or more, preferably several, large air passages 15 that are adapted to be opened or closed to a greater or lesser extent by a perforated damper 16, which, as shown, is mounted to slide on the partition 13 with one end working under the retaining flange 16a and provided at its other end with a rod-like operating handle 17 that projects through the side of the frame 11. The bottom of the frame 11 on each side of the vertical partition 14 is formed with long enlarged air passages 18. When one or more of the devices have been applied to the windshield, the air passages 18 will overlie the cowl and one will overlie a warm air discharge passage 19 formed in the cowl. Below the cowl is located the heater.

In the drawing the heater 9 is shown as provided with an auxiliary warm air discharge tube 20, which in the arrangement illustrated, has discharge nozzles 21 that extend upward through the air passages 19 and underlie the warm air intake passages 18 of the two devices. Whether the air is supplied through the nozzles 21 or simply from the air passages 19 or otherwise, the warm air will pass upward through one of the passages 18 of each device and will be discharged outward through the other or opposite air passage. The warm air primarily will be introduced into the lower compartment $b$ and will there be somewhat delayed while it is escaping upward into the upper compartment $a$. As the air is cooled by contact with the windshield, it will move downwardly and find its outlet through the opposite air passages 18. Of course, the speed of travel of the warm air upward and thence downward through the passages of the horizontal partition 13 and dampers 16 may be regulated at will. There will always be a greater upward travel of air through one than through the other of the air passages 18 so that complete travel through the compartment $a$ and $b$ and against the windshield will be insured. The efficiency of the device described has been thoroughly demonstrated through a cold winter in the northern part of the United States. The device is of small cost and may be easily applied and removed. Of course, one or more of the devices may be employed.

In Fig. 5 the device is shown as applied to the windshield by the use of vacuum cups indicated at 22.

From the foregoing, it will be understood that the improved device may be modified as to details of construction and arrangement of parts within the scope of the invention herein disclosed and claimed.

In the claim and elsewhere, the improved device above described is usually designated as a frost remover; and the term windshield is used in a sense broad enough to indicate any transparent window or pane that is subject to accumulation of frost or ice under low temperatures.

What we claim is:

In a frost remover for windshields, a marginal frame open at its front side for application directly to the windshield, a transparent plate applied across the rear face of said frame and adapted to be spaced from the windshield by said frame, a horizontal partition extending across the lower portion of said frame, a short vertical partition dividing the lower portion of said frame into laterally spaced compartments that have no direct communication, said horizontal partition being located so far down that the major upper air space far exceeds the combined air space of the two lower compartments, said horizontal partition on opposite sides of said vertical partition having restricted air passages, independent dampers for independently regulating the air flow through the air passages of said horizontal partition that are on opposite sides of said vertical partition, a warm air supply pipe opening into one of the lower compartments through the bottom of said frame, the bottom of said frame in the other compartment having a downwardly open air discharge passage, the major upper portion of the space within said frame being free from obstructions.

EDWIN L. ERICKSON.
GEORGE H. ERICKSON.